United States Patent
Dabak et al.

(10) Patent No.: US 11,736,144 B2
(45) Date of Patent: Aug. 22, 2023

(54) DECOMPOSED REAL-IMAGINARY EQUALIZER

(71) Applicant: Texas Instruments Incorporated, Dallas, TX (US)

(72) Inventors: Anand Dabak, Plano, TX (US); Mahmoud Abdelmoneim Abdelmoneim Elgenedy, Worcester, MA (US); Timothy Mark Schmidl, Dallas, TX (US); Swaminathan Sankaran, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/096,886

(22) Filed: Nov. 12, 2020

(65) Prior Publication Data
US 2022/0149892 A1 May 12, 2022

(51) Int. Cl.
*H04B 3/32* (2006.01)
*H04L 25/03* (2006.01)

(52) U.S. Cl.
CPC ......... *H04B 3/32* (2013.01); *H04L 25/03057* (2013.01)

(58) Field of Classification Search
CPC ........... H04B 3/32; H04L 25/03057; H04L 25/03885; H04L 2025/0349; H04L 27/01; H04L 2025/03636; H04L 2025/03484; H04L 25/03019; H04L 25/03267
See application file for complete search history.

(56) References Cited

U.S. PATENT DOCUMENTS

| | | | | |
|---|---|---|---|---|
| 4,053,837 A | * | 10/1977 | Ryan | H04L 27/01 375/235 |
| 5,475,444 A | * | 12/1995 | Kim | H04N 21/426 348/614 |
| 6,907,065 B2 | | 6/2005 | Kim | |
| 8,923,460 B1 | * | 12/2014 | Wang | H04B 10/6162 375/350 |
| 9,042,855 B1 | * | 5/2015 | Ottini | H03D 7/165 455/295 |
| 9,077,455 B2 | * | 7/2015 | Randel | H04B 10/616 |
| 2007/0253515 A1 | * | 11/2007 | Kawai | H04L 7/0083 375/359 |
| 2008/0120356 A1 | * | 5/2008 | Watanabe | H03H 17/04 708/320 |
| 2011/0081872 A1 | * | 4/2011 | Bar-Sade | H04L 12/46 455/77 |

(Continued)

OTHER PUBLICATIONS

"Adaptive Equalizers", Mathworks Release Notes R2019b, copyright 1994-2019, available at https://www.mathworks.com/help/comm/ug/adaptive-equalizers.html on Dec. 7, 2019, pp. 1-24.

*Primary Examiner* — Sophia Vlahos
(74) *Attorney, Agent, or Firm* — John R. Pessetto; Frank D. Cimino

(57) ABSTRACT

In described examples of a signal equalizer, a first filter stage is configured to perform adaptive equalization of crosstalk between a first signal component and a second signal component of a complex signal. A second filter stage is coupled serially to the first filter stage. The second equalizer stage is configured to perform separate adaptive equalization of the first signal component and separate adaptive equalization of the second signal component.

11 Claims, 11 Drawing Sheets

(56) References Cited

U.S. PATENT DOCUMENTS

| | | | |
|---|---|---|---|
| 2012/0002979 A1* | 1/2012 | Xie | H04B 10/6162 |
| | | | 398/208 |
| 2013/0034142 A1* | 2/2013 | Kitta | H04L 27/01 |
| | | | 375/229 |
| 2019/0229884 A1* | 7/2019 | Xue | H04B 1/525 |
| 2020/0252094 A1* | 8/2020 | Wang | H04B 1/10 |

* cited by examiner

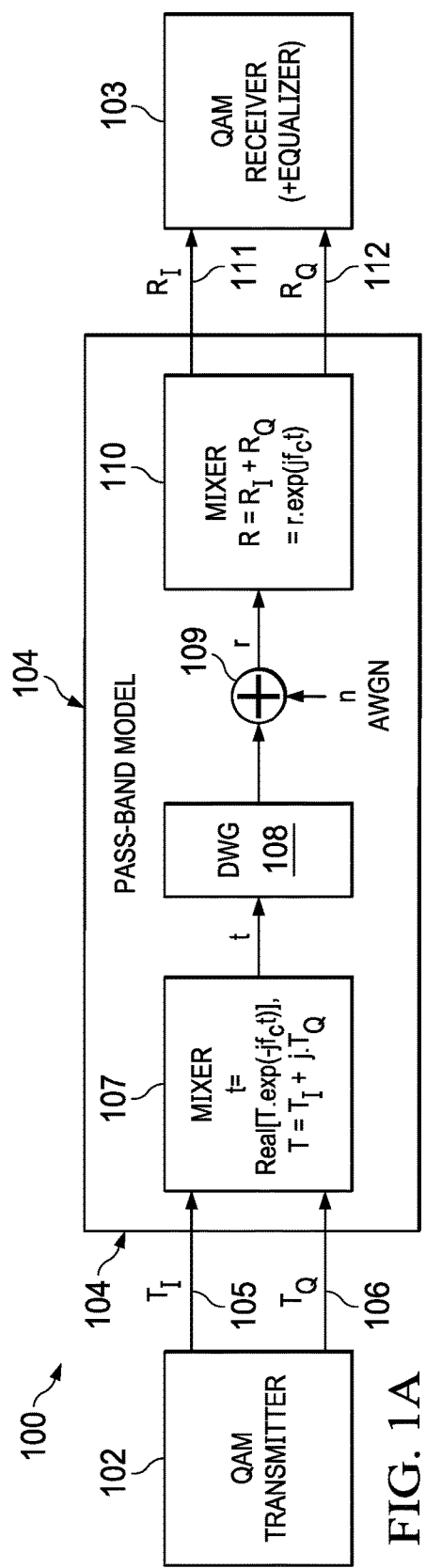
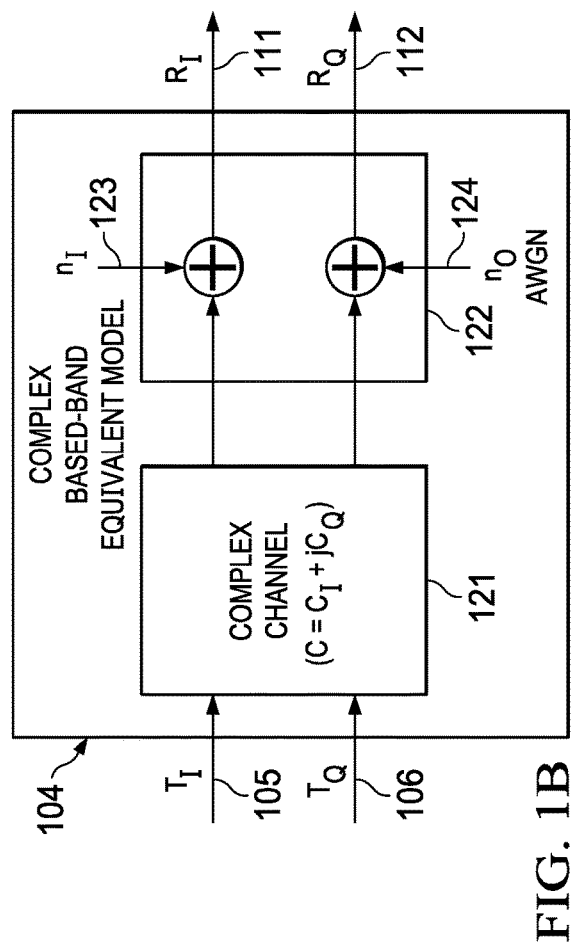
FIG. 1A
FIG. 1B

DECOMPOSED REAL-IMAGINARY EQUALIZER

TECHNICAL FIELD

This relates to an adaptive equalizer that is decomposed into separate real and imaginary stages.

BACKGROUND

Based on the concept of real numbers, a complex number is a number of the form a+bi, where a and b are real numbers, and i is an indeterminate satisfying $i^2=-1$. The real number a is called the real part of the complex number a+bi; the real number b is called its imaginary part.

For a dielectric waveguide cable in the millimeter-wave frequency band (110-140 GHz), the channel group delay is generally asymmetric parabolic. Therefore, the channel impulse response is a complex multipath response in which a multipath cross talk exists between the transmitted in-phase and quadrature phase components. For passband transmission, two independent signals can be transmitted by modulating the amplitude and phase of sinusoidal signal. Equivalently, the two independent signals can be transmitted by modulating the amplitude of two sinusoidal signals phase shifted by 90 degrees. An equivalent system is modeled as a complex baseband (in-phase and quadrature-phase) transmitted/received signals. A QAM (quadrature amplitude modulation) or a QPSK (quadrature phase shift keying) transmission method may be used, for example. When a passband signal (or equivalently a complex baseband signal) is transmitted over a complex channel (a multipath where each path has a different phase, such as a DWG channel), the two transmitted independent components, amplitude and phase of passband signal (equivalently, in-phase and quadrature phase of the complex baseband signal) will interfere with each other. Accordingly, in addition to a multipath channel effect on each component, they will suffer from crosstalk between each other.

A dielectric waveguide (DWG) is a high frequency alternative to copper wires and optical cables. A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions, thereby causing dielectric polarization. Because of dielectric polarization, positive charges are displaced toward the field, and negative charges shift in the opposite direction. This creates an internal electric field, which reduces the overall field within the dielectric itself. If a dielectric is composed of weakly bonded molecules, those molecules become polarized, and also reorient, so their symmetry axis aligns to the field. While the term "insulator" implies low electrical conduction, "dielectric" is typically used to describe materials with a high polarizability; which is expressed by a number called the dielectric constant (εk). The term insulator generally indicates electrical obstruction while the term dielectric indicates the energy storing capacity of the material by means of polarization.

A single stage adaptive complex equalizer with complex taps for in-phase and quadrature phase components is useful to reverse a signal's distortion as it traverses a channel, such as through a DWG. The equalizer can be either a linear complex equalizer having a feedforward (FF) filter only, or decision feedback (DFE) complex equalizer having feedforward and feedback (FB) parts.

SUMMARY

In described examples of a signal equalizer, a first filter stage is configured to perform adaptive equalization of crosstalk between a first signal component and a second signal component of a complex signal. A second filter stage is coupled serially to the first filter stage. The second equalizer stage is configured to perform separate adaptive equalization of the first signal component and separate adaptive equalization of the second signal component.

BRIEF DESCRIPTION OF THE DRAWINGS

FIGS. 1A and 1B are block diagrams illustrating a system having a complex communication channel.

DETAILED DESCRIPTION

Figure 2A:
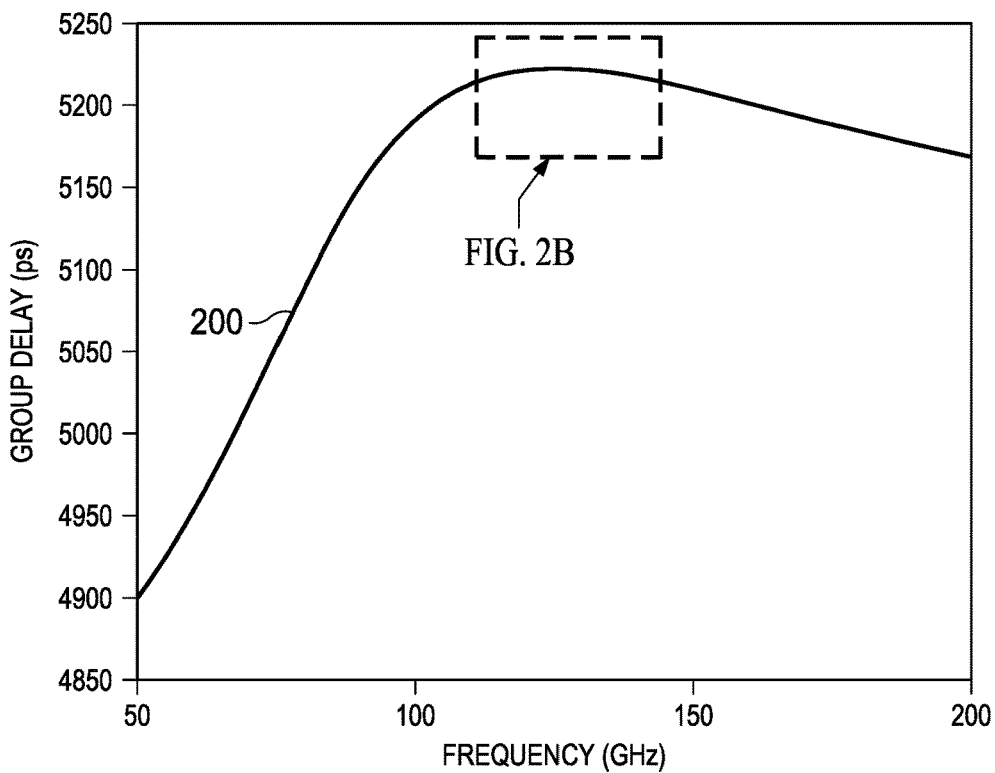
FIGS. 2A and 2B are plots of group delay of a signal propagating through a DWG.

In the drawings, like elements are denoted by like reference numerals for consistency.

For a dielectric waveguide (DWG) cable in the millimeter-wave frequency band, (110-140 GHz), the channel group delay is generally asymmetric parabolic. Consequently, the channel impulse response is a complex multipath response, which produces multipath cross talk between the transmitted in-phase and quadrature phase components of the channel. Usually, a single stage adaptive complex equalizer having complex taps for in-phase and quadrature phase components is useful to reverse a signal's distortion incurred as it traverses a channel, such as through a DWG. However, an equalizer for operation in the millimeter-wave frequency band having complex taps is difficult to implement and fabricate in a single integrated circuit.

Adaptive equalizer structures provide suboptimal equalization of time variations in the propagation channel characteristics. However, these equalizers are appealing, because their computational complexity is lower than maximum-likelihood sequence estimation (MLSE) equalizers. Adaptive equalizer structure options include linear and decision-feedback. Adaptive algorithm options include least mean square (LMS), recursive least square (RLS), and constant modulus algorithm (CMA). The general operation of adaptive equalizers is described, for example, in "Adaptive Equalizers," Mathworks Release Notes R2019b, 2019.

To decode a received signal, an adaptive equalizer first applies a finite impulse response (FIR) feedforward filter to the symbols in the input signal. The FIR filter tap weights correspond to a channel estimate. The adaptive filter then outputs the signal estimate and uses the signal estimate to update the tap weights for the next symbol using a feedback filter. The signal estimate and updating of weights depends on the adaptive equalizer structure and algorithm.

In examples described herein, a decomposed cascaded two-stage feedforward filter replaces a single stage complex feedforward filter. The decomposed two-stage filter has one stage that performs pure real equalization, while the other stage performs a pure imaginary equalization. The example decomposed two-stage filter structures described herein provide lower complexity, more flexibility, and better performance than a conventional single stage complex equalizer. In various examples, the feedback filter portion of the adaptive equalizer can be either a single stage, decomposed, or removed completely.

In described examples, a low complexity analog implementation reduces the loading on critical signals and simplifies the delay match between real and imaginary paths.

In some examples, the first stage is configured to be a pure imaginary stage. This enables the second stage to use a standard serializer/deserializer (SERDES) module.

As described in more detail herein, flexible structures have different complexity/performance tradeoffs.

FIG. 1A is a block diagram of an example system 100 that includes QAM transmitter 102, QAM receiver 103, and a complex a communication channel 104 coupled between an output of QAM transmitter 102 and an input of QAM receiver 103. In this example, QAM transmitter 102 produces a complex signal that includes an in-phase signal component 105 and a quadrature-phase signal component 106. Receiver 103 receives in-phase complex signal component 111 and quadrature-phase complex signal component 112, equalizes the complex signal, and then demodulates the complex signal using known or later developed demodulation techniques. The demodulated signal is then output for further processing by an associated system (not shown) using known or later developed communication and/or signal processing techniques.

DWG 108 has a multipath channel effect. Therefore, if information is modulated in magnitude and phase of a transmitted passband sinusoidal signal, DWG 104 will affect both magnitude and phase. Equivalently, in a base-band equivalent model, in-phase and quadrature-phase components of an information signal will be impacted due to the effective multi-path channel. QAM receiver 103 includes an equalizer described in more detail below to mitigate the effects of the multipath channel effects, in order to improve signal to noise ratio (SNR).

FIG. 1A shows complex communication channel 104 as a pass-band model. In this example, mixer 107 represents the up-conversion for the transmitted signal from a complex base-band to real passband signal. Adder 109 represents the effect of ambient noise that gets added to the complex signal during transmission through DWG 104. Mixer 110 represents further down-conversion for the received real passband signal to equivalent complex base0 band signal. In this example, the noise is assumed to be additive white Gaussian noise (AWGN).

FIG. 1B is a block diagram of complex communication channel 104 as a complex based-band equivalent model. In this example, transmission media 121 transports a complex signal that includes in-phase signal component 105 and quadrature-phase component 106. Complex AWGN (having an in-phase component 123 and a quadrature-phase component) is injected into the complex signal via adders 122.

Figure 2B:
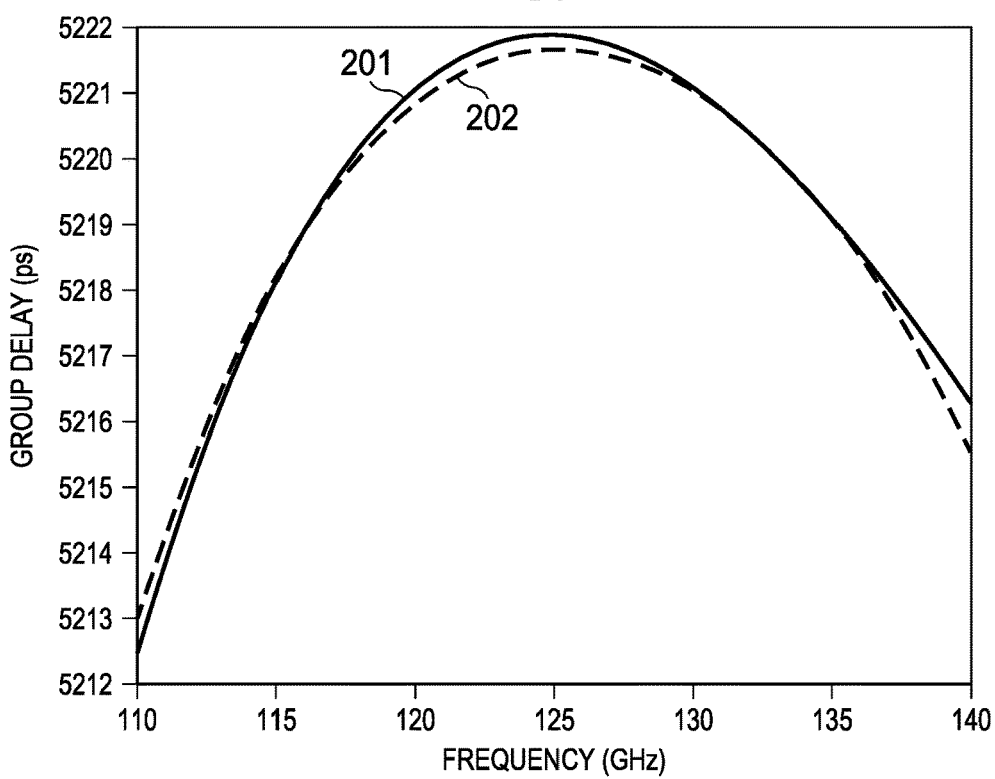

FIGS. 2A and 2B are plots of group delay of a signal propagating through an example DWG. FIG. 2A illustrates a plot 200 group delay (ps) vs frequency (GHz) over a range of 50-200 GHz. FIG. 2B illustrates an expanded view of the plot over a range of 110-140 GHz for two different simulation models represented by plot 201 and 202. Initial measurements show that the DWG channel in the frequency band 110-140 GHz has an asymmetric parabolic group delay, which results in a multipath interference as well as a multipath crosstalk between in-phase and quadrature-phase transmitted data. For example, with a passband from 110 to 140 GHz, the group delay variation from the lower edge of the band (110 GHz) to the center of the band (125 GHz) is about 9 ps/m, and the variation from the center to the upper edge of the band (140 GHz) is about 6 ps/m. Also, if the group delay is not centered around the center frequency (125 GHz), then the equivalent group delay becomes more asymmetric.

Figure 3:
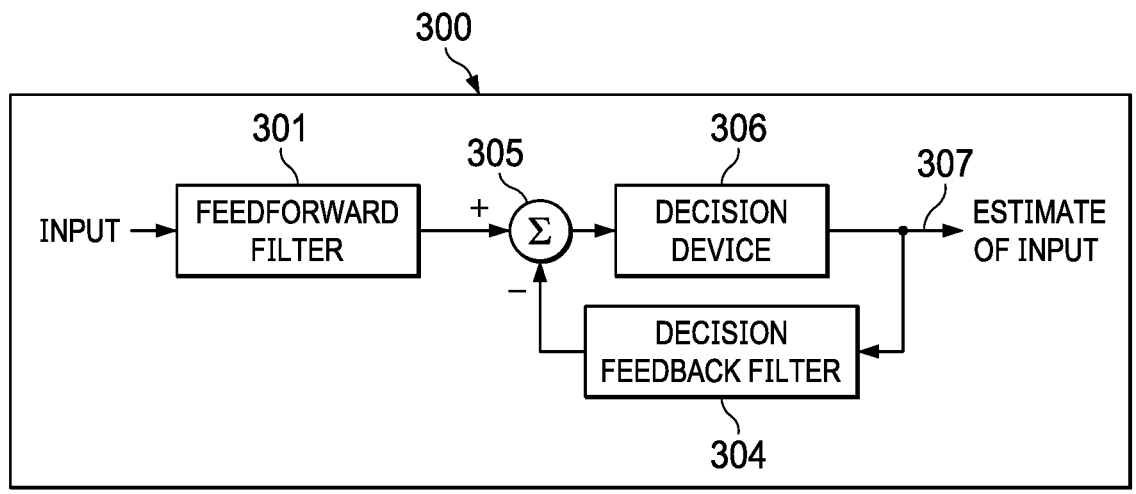
FIG. 3 is a block diagram of an example adaptive equalizer for a complex channel.

FIG. 3 is a block diagram of an example SERDES equalizer 300 for a complex channel that operates at a frequency of 100 GHz, or more. Equalizer 100 includes a complex feedforward filter 301, a complex feedback filter 304, and a decision module 306 that produces an output signal 307 which is an equalized estimate of the input signal after subtracting the output of the feedback filter from the output of the feedforward filter using subtractor 305. In this example, the input signal is a QPSK signal. Other examples may be designed in a similar manner for other quadrature type complex signals. As descried below, complex feedforward filter 301 is a decomposed cascaded two-stage feedforward filter. In some examples, decision feedback filter 304 is a decomposed cascaded two-stage feedback filter.

Figure 4:
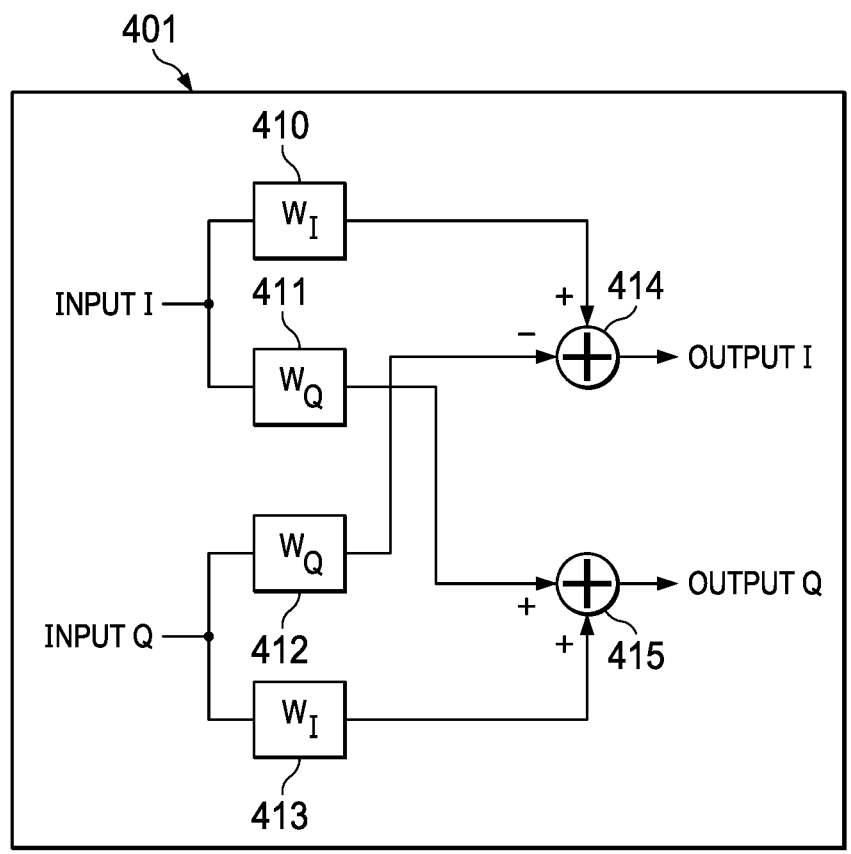
FIGS. 4 and 5 illustrate a conventional feed-forward filter for a complex channel.

FIG. 4 is a block diagram of a conventional single-stage complex feedforward filter 401. A filter module $w_I$ 410 for an in-phase portion of the channel and a filter module $w_Q$ 411 for quadrature-phase portion of the channel are connected to an input for the in-phase signal. Similarly, a filter module $w_Q$ 412 for a quadrature-phase portion of the channel and a filter module $w_I$ 413 for an in-phase portion of the channel are connected to an input for the quadrature-phase signal. Adder 414 combines the output of the in-phase filter 410 and the quadrature phase filter 411 to form an output for the in-phase transmitted component, while adder 414 combines the output of the in-phase filter 413 and the quadrature phase filter 412 to form an output for the quadrature-phase transmitted component.

Figure 5:
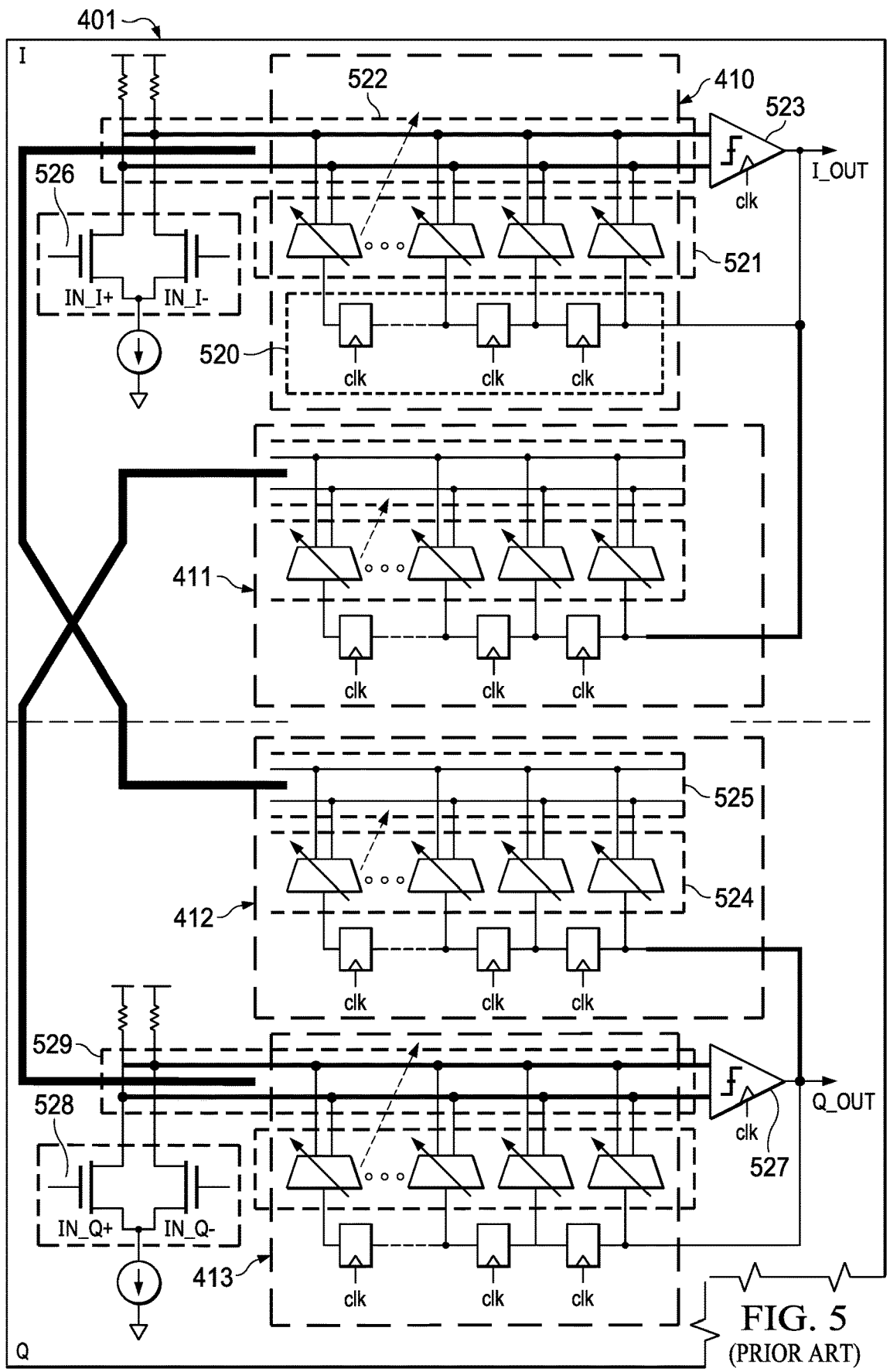

FIG. 5 is a schematic of the single-stage feed-forward filter 401 in more detail. In-phase filter 410 includes a digital delay line 520 that delays in-phase output signal I_OUT provided by comparator 523 for one clock cycle at each tap. Multiplying unit 521 multiplies each tap coefficient value by the data provided by the delay line 520. The output of each stage of multiplying unit 521 is combined on differential adder bus 522, which is in-turn coupled to an input of comparator 523. Differential input receiver 526 is coupled to differential summer bus 522.

Quadrature-phase filter 412 operates in a similar manner, with the outputs of multiplying unit 525 combined on differential adder bus 525. Adder bus 525 is coupled to adder bus 522 to thereby add the output of in-phase filter 410 with the output of quadrature phase filter 412, as illustrated by adder 414 (FIG. 4).

In a similar manner, comparator 527 forms quadrature-phase output signal Q_OUT, based on the state of differential adder bus 529 that is coupled to the output of quadrature-phase filter 411, in-phase filter 413, and differential input receiver 528.

A problem with this approach is the loading produced on differential input receivers 526, 528 and the respective multiplying units within filters 410-414. With conventional semiconductor fabrication techniques, reliable operation at a target data rate of 100 Gbps using the 110-140 GHz band is not feasible with the configuration of feedforward filter 401.

Figure 6:
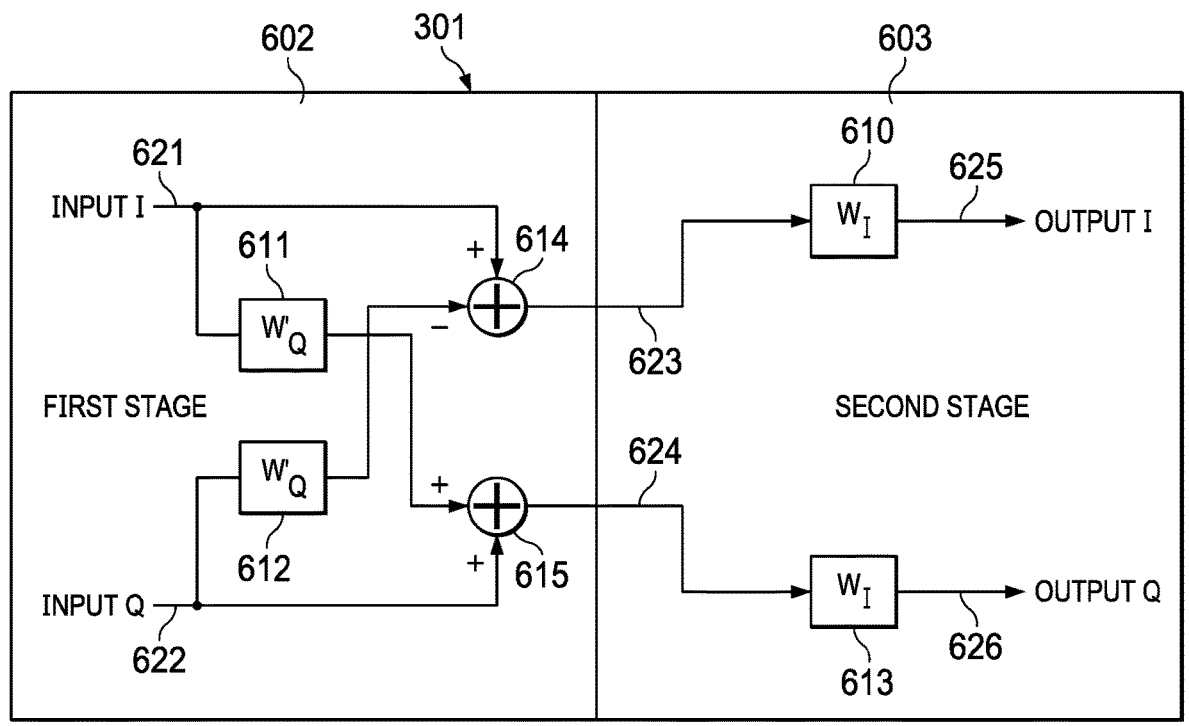
FIGS. 6 through 10 are block diagrams of example decomposed two-stage filters for a complex channel.

FIG. 6 is a block diagram of example decomposed two-stage filter 301 for a complex channel within adaptive equalizer 300 of FIG. 3. As described above, an analog implementation to support a target data rate of 100 Gbps using a single-stage complex filtering (as illustrated by filter 401 of FIGS. 4-5) is too complicated for conventional semiconductor fabrication techniques to produce an integrated circuit at an acceptable commercial price. Similarly, a digital implementation using digital signal processing techniques is not feasible at 100 Gbps.

One option might be to dispense with complex filtering, and only perform real filtering while ignoring the complex crosstalk effects. However, simulation has shown that using a simple all real filtering equalizer is insufficient to achieve a low bit error rate in a target DWG environment, because of the high crosstalk. For example, a target bit error rate for an example system may be less than 1e-12.

To mitigate the complex channel, examples described herein decompose a single stage complex equalizer feedforward filter into two cascaded stages, such as first stage 602 and second stage 603 that are coupled in a serial configuration as illustrated in FIG. 6. One stage performs real filtering and the other stage performs imaginary filtering. The filtering operation of the two-stage decomposed structure is equivalent to a single stage complex filtering having a comparable number of taps. In various examples, an LMS (least mean squared) adaptation for the decomposed structure may implement either joint or independent adaptation for the two stages, as described in more detail below. The number of taps of each stage can be generally different, which adds more flexibility to the decomposed structure. Furthermore, it is possible to selectively design an example two-stage adaptive complex equalizer to perform either the real filter function or the imaginary filter function first.

The feedback filter for an example equalizer is less complicated than the feedforward filter, because the number of taps of the feedback filter as well as the number of input levels can be less than used for the feedforward filter. Accordingly, an example feedback filter can be implemented as a complex single stage filter or can be implemented as a two-stage decomposed filter in a similar manner as the feedforward filter.

Referring still to FIG. 6, first stage 602 of feedforward filter 301 performs adaptive filtering of crosstalk between the in-phase signal component that is received on input 621 and the quadrature-phase signal component that is received on input 622, using tapped delay-line quadrature-phase filters 611, 612. Adder 614 subtracts the crosstalk correction output of filter 612 from the in-phase signal 621 and outputs a crosstalk compensated in-phase signal 621. Similarly, adder 615 adds the crosstalk correction output of filter 611 to the quadrature-phase signal 622 and outputs a crosstalk compensated quadrature-phase signal 624. Second stage 603 performs separate adaptive filtering of the compensated in-phase signal component 623, using in-phase filter 610 to produce filtered in-phase signal 625. Simultaneously, second stage filter 603 performs separate adaptive filtering of the compensated quadrature-phase signal component 624, using in-phase filter 613 to produce filtered quadrature-phase signal 626.

In this example, quadrature-phase filters 611 and 612 are configured to conform to expression (1), in order to maintain equivalence for the cascaded system of $w'_Q$ followed by $w_I$ to quadrature-phase filters ($w_Q$) 411, 412 of FIG. 4.

$$w_Q(n)=w'_Q(n)*w_I(n) \tag{1}$$

where * denotes convolution operation.

Figure 7:
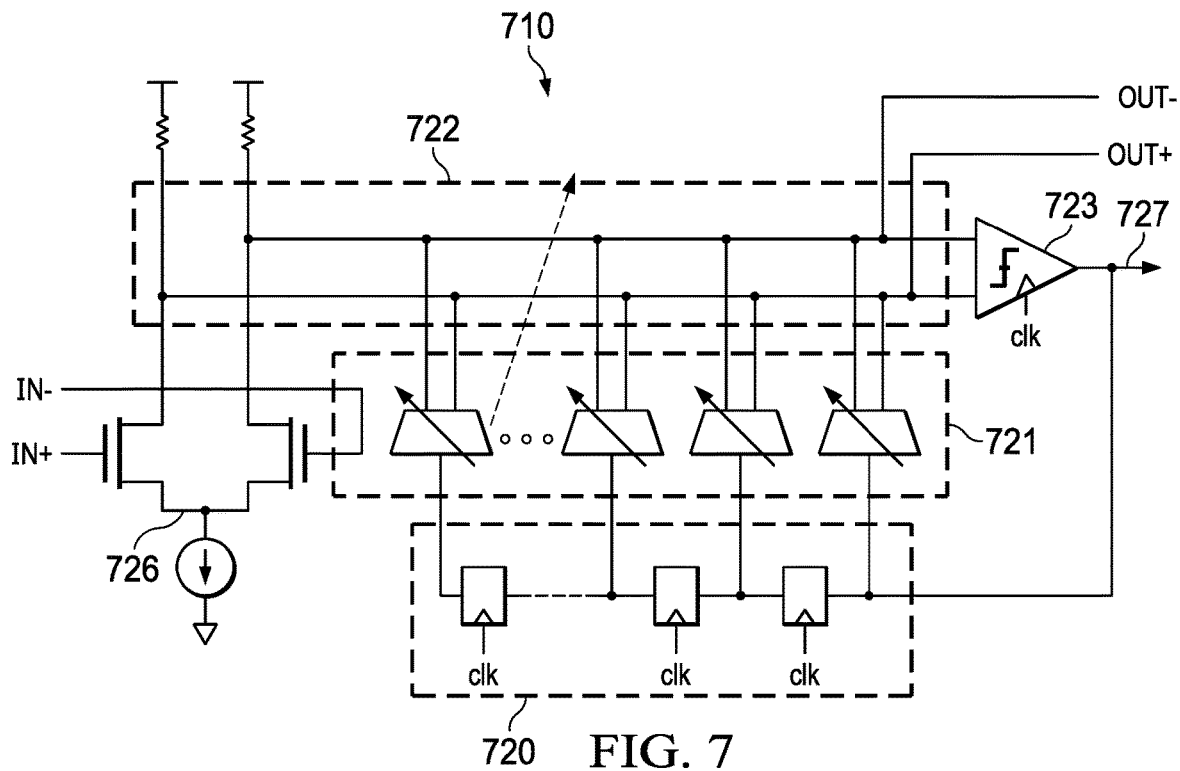

FIG. 7 is a schematic of an example tapped delay line filter 710 which may be adapted for filters 611-614 of FIG. 6. Example filter 710 includes a digital delay line 720 which delays decision signal 727 provided by comparator 723 for one clock cycle at each tap. Multiplying unit 721 multiplies each tap coefficient value by the data provided by the delay line 720 (0 or 1). The output of each stage of multiplying unit 721 is combined on differential adder bus 722, which is in-turn coupled to an input of comparator 723. Differential input receiver 726 is coupled to differential summer bus 722.

In an example filter 710, the number of taps in delay line 720 and the respective number of multiplier stages 721 may be selected to optimize the filter design for a selected frequency of operation. Thus, in an example filter 301, each of the filters 611-614 may respectively have a different number of taps. In another example filter 301, the filters 611-614 may all be implemented with a same number of taps, for example.

Figure 8:
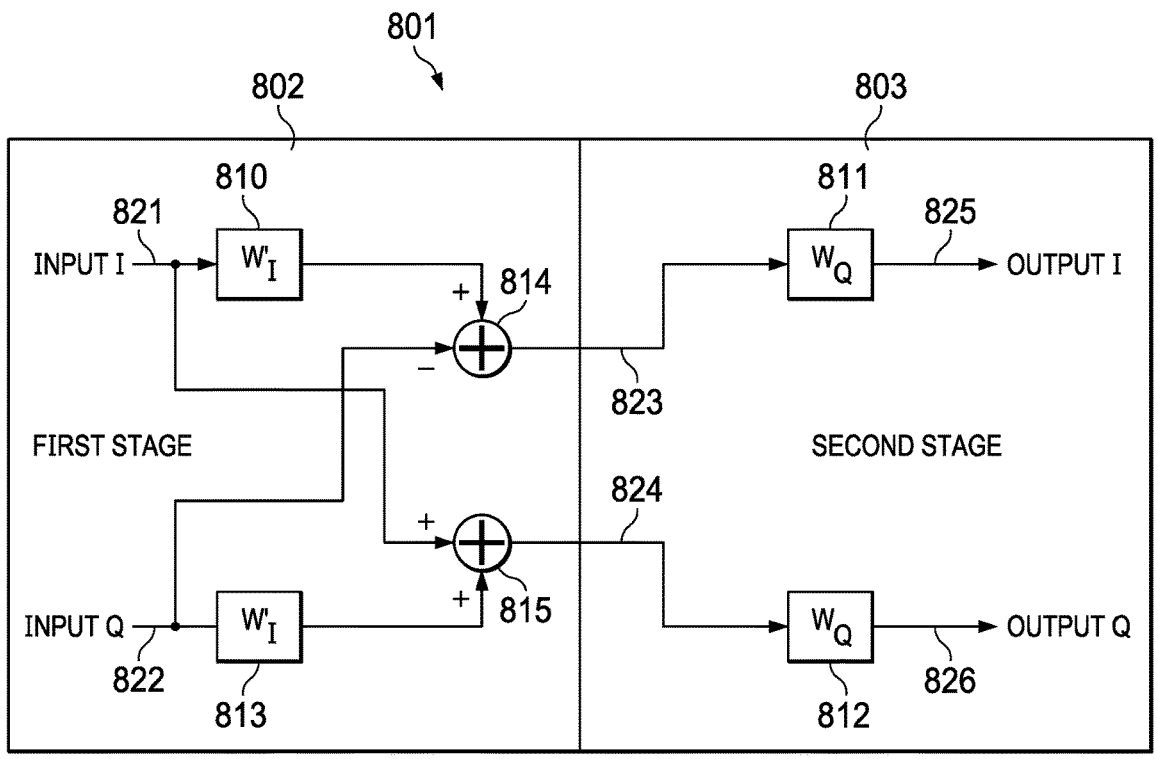

FIG. 8 is another example of a decomposed two-stage filter 801 for a complex channel. Two-stage filter 801 may be used in place of two-stage filter 301 in FIG. 3. In this example, first stage 802 of feedforward filter 801 performs adaptive filtering of crosstalk between the in-phase signal component that is received on input 821 and the quadrature-phase signal component that is received on input 822, using tapped delay-line in-phase filters 810, 813. Adder 814 subtracts the quadrature-phase signal 822 from the crosstalk correction output of filter 810 and outputs a crosstalk compensated in-phase signal 823. Similarly, adder 815 adds the crosstalk correction output of filter 813 to the in-phase signal 821 and outputs a crosstalk compensated quadrature-phase signal 824.

Second stage 803 is coupled serially to first stage 802 and performs separate adaptive filtering of the compensated in-phase signal component 823, using quadrature-phase filter 811 to produce filtered in-phase signal 825. Simultaneously, second stage filter 803 performs separate adaptive filtering of the compensated quadrature-phase signal component 824, using quadrature-phase filter 812 to produce filtered quadrature-phase signal 826.

In this example, in-phase filters 810 and 813 are configured to conform to expression (2), in order to maintain equivalence for the cascaded system of $w'_I$ followed by $w_Q$ to in-phase filters ($w_Q$) 410, 413 of FIG. 4.

$$w_I(n)=w'_I(n)*w_Q(n) \tag{2}$$

where * denotes convolution operation.

Figure 9:
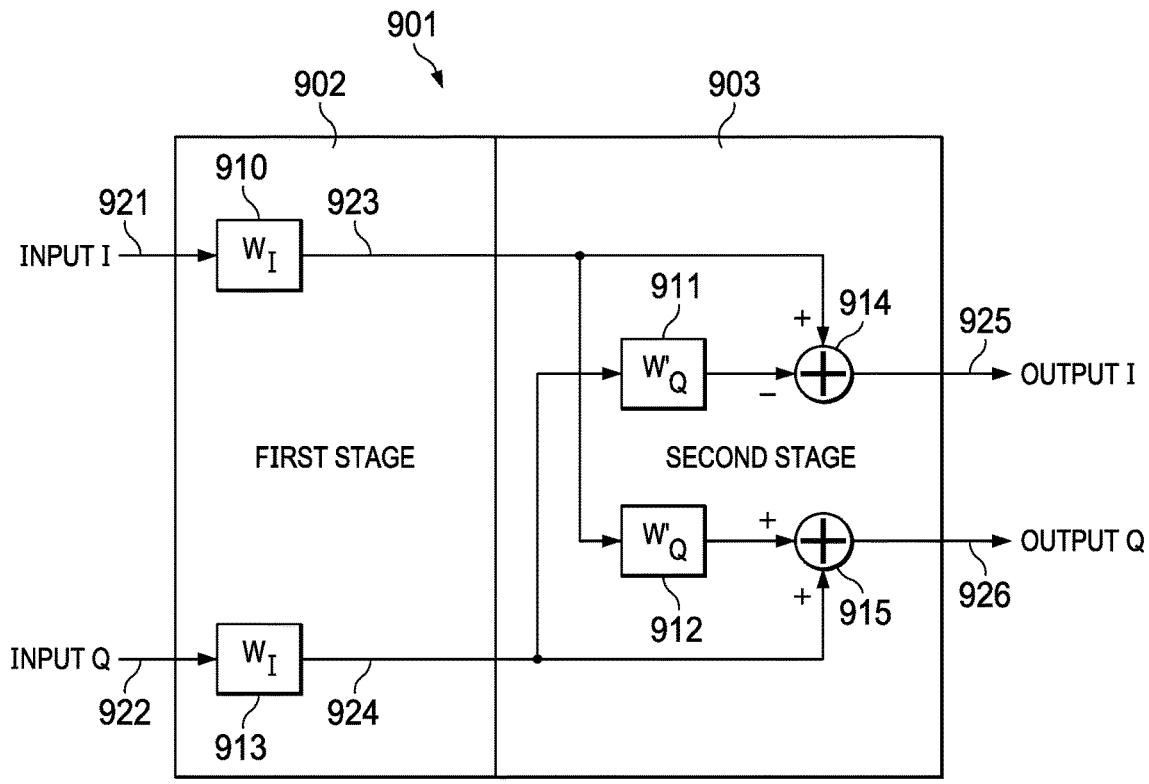

FIG. 9 is another example of a decomposed two-stage filter 901 for a complex channel. Two-stage filter 901 may be used in place of two-stage filter 301 in FIG. 3. In this example, the order of operation of the first stage 902 and the second stage 903 is reversed from the example two-stage filter 601 of FIG. 6 and filter 801 of FIG. 8. In this example two-stage filter 901, first stage 902 is configured to perform: separate adaptive equalization of a first signal component of a complex signal that is received on input 921, and separate adaptive equalization of a second signal component of the complex signal that is received on input 922. Second stage 903 is coupled serially to first stage 902 and is configured to perform adaptive equalization of crosstalk between the first signal component and the second signal component of the complex signal transmitted over a complex channel.

In this example, first stage 902 performs separate adaptive filtering of the received in-phase signal component 921, using in-phase filter 910 to produce filtered in-phase signal 923. Simultaneously, first stage filter 902 performs separate adaptive filtering of the received quadrature-phase signal component 922, using in-phase filter 913 to produce filtered quadrature-phase signal 924. Second stage 903 of feedforward filter 901 performs adaptive filtering of crosstalk between the filtered in-phase signal component 923 and the filtered quadrature-phase signal component 924, using tapped delay-line quadrature-phase filters 911, 912. Adder 914 subtracts the crosstalk corrected output of filter 911 from filtered quadrature-phase signal 923 and outputs a complex filtered in-phase signal 925. Similarly, adder 915 adds the crosstalk correction output of filter 912 to the filtered quadrature-phase signal 924 and outputs a complex filtered quadrature-phase signal 926.

In this example, quadrature-phase filters 911 and 912 are configured to conform to expression (1), in order to maintain equivalence to quadrature-phase filters 411, 412 of FIG. 4.

Figure 10:
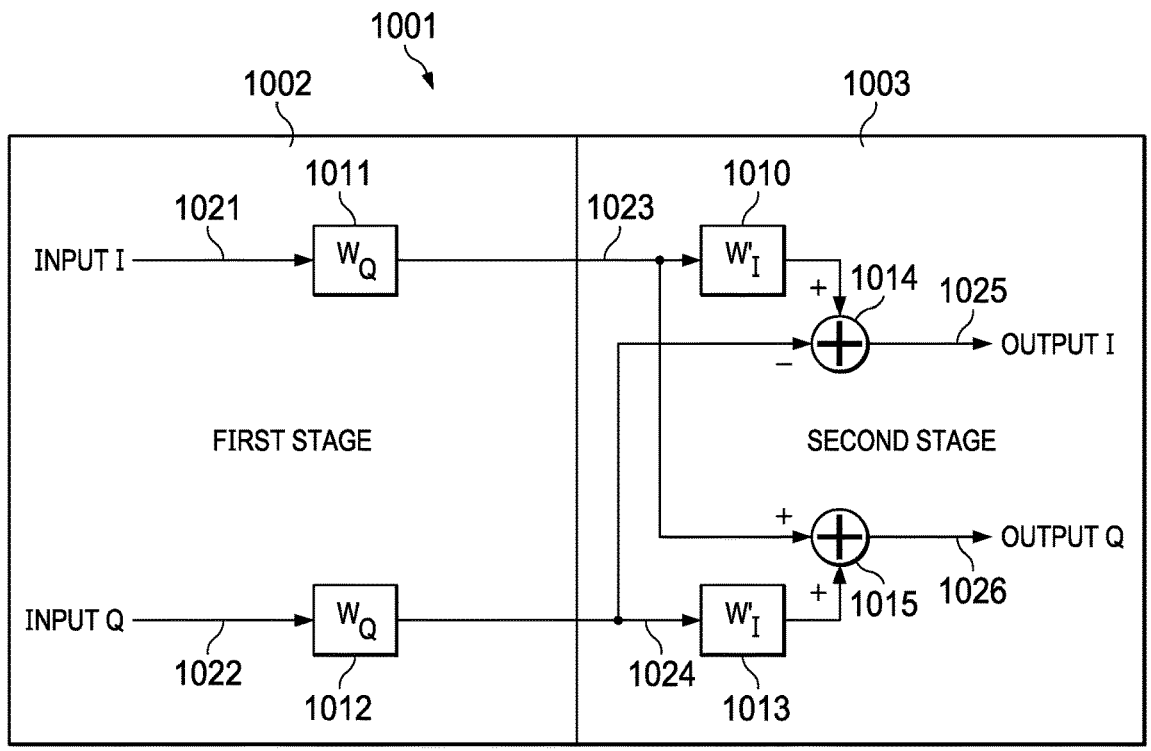

FIG. 10 is another example of a decomposed two-stage filter 1001 for a complex channel. Two-stage filter 1001 may be used in place of two-stage filter 301 in FIG. 3. In this example, the order of operation of the first stage 1002 and the second stage 1003 is reversed from the example two-stage filter 601 of FIG. 6 and filter 801 of FIG. 8.

In this example, first stage 1002 performs separate adaptive filtering of the received in-phase signal component 1021, using quadrature-phase filter 1011 to produce filtered in-phase signal 1023. Simultaneously, first stage filter 1002 performs separate adaptive filtering of the received quadrature-phase signal component 1022, using quadrature-phase filter 1012 to produce filtered quadrature-phase signal 1024. Second stage 1003 of feedforward filter 1001 is coupled in series to first stage 1002 and performs adaptive filtering of crosstalk between the filtered in-phase signal component 1023 and the filtered quadrature-phase signal component 1024, using tapped delay-line in-phase filters 1010, 1013. Adder 1014 subtracts the filtered quadrature-phase signal 1024 from the output of in-phase filter 1010 and outputs a complex filtered in-phase signal 1025. Similarly, adder 1015 adds the output of quadrature-phase filter 1013 to the filtered in-phase signal 1023 and outputs a complex filtered quadrature-phase signal 1026.

In this example, in-phase filters 1010 and 1013 are configured to conform to expression (2), in order to maintain equivalence to quadrature-phase filters 410, 413 of FIG. 4.

Equivalency Analysis

It can be demonstrated using linear system theory that each of the examples 301, 801, 901, 1001 produce an equivalent filtering function. For example, all filters ($w_I$, $w'_I$, $w_Q$, $w'_Q$) are linear systems, adders (614 and 615) in design 301 can be moved to the end of the design, i.e., after 610 and 613, which leads to two branches with $w_1$ (610) and two branches with cascaded $w'_Q$ (611) and $w_I$ (610). Moreover, for cascaded linear systems, e.g., $w'_Q$ (611) and $w_I$ (610) filters, it is possible to reverse the order with exact same functionality. This will lead design 301 to be equivalent to design 901. By comparison, given expressions (1) and (2), design 301 is equivalent to design 801, and design 901 is equivalent to design 1001. Accordingly, the four designs 301, 801, 901 and 1001 are all equivalent.

Figure 11:
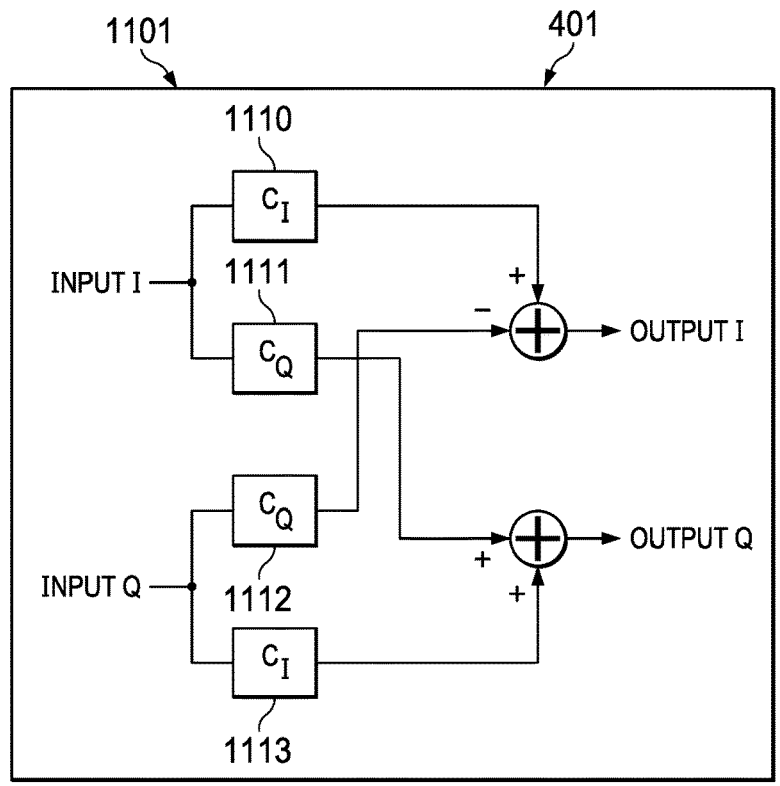
FIG. 11 is a block diagram of a complex channel filtering model.

FIG. 11 is a block diagram for a complex channel model 1101. Referring to FIGS. 1A and 1B, communication channel 104 can be modeled as linear system (linear filtering). In this example, $C_I$ 1110, 1113 represent the complex channel real part, and $C_Q$ 1111, 1112 represent the complex channel imaginary part. $C_Q$ 1111, 1112 are the channel parts that are causing cross talk interference between the signal transmitted in-phase ($T_I$) 105 in FIG. 1A and the q-phase ($T_Q$) 106 in FIG. 1A. If the transmitted signal is real PAM (not complex QAM), there is no problem from the complex channel because $C_Q$ will be only leakage and can be neglected.

Likewise, complex channel 104 (FIG. 1B) can be modeled using matrix notation, because linear filtering can be represented using Toeplitz matrix multiplication, as shown in expression (3).

$$\begin{bmatrix} R_I \\ R_Q \end{bmatrix} = \begin{bmatrix} C_I & -C_Q \\ C_Q & C_I \end{bmatrix} \begin{bmatrix} T_I \\ T_Q \end{bmatrix} + \begin{bmatrix} n_I \\ n_Q \end{bmatrix} \quad (3)$$

In the case of a multi-tap channel, $C_I$ and $C_Q$ are Toeplitz convolution matrices. Moreover, $T_I$, $T_Q$, $R_I$, $R_Q$, $n_I$ and $n_Q$ are vectors. For a special case when a channel is a single tap, all elements in the expression (3) matrix will be scalars. If $C_Q$ is zero, the channel matrix will be diagonal, and no cross-talk occurs.

Therefore, equivalence between designs 301 and 901 can be done analytically using matrix representation. Consider R=[$R_I$; $R_Q$] as the received input vector and indicate the first stage 602 (FIG. 6) as A and second stage 603 (FIG. 6) as B. In this case, filter 301 (FIG. 6) output vector $\overline{R}_{out1}$=[$\overline{R}_{I,1}$; $\overline{R}_{Q,1}$] can be represented as the matrix multiplication of $\overline{R}_{out1}$=ABR. Similarly, filter 901 (FIG. 9) output vector $\overline{R}_{out2}$ can be represented as $\overline{R}_{out2}$=BAR. Filter design 301 is equivalent to filter design 901, and accordingly $\overline{R}_{out1}$=$\overline{R}_{out2}$, only if it can be proved that the matrix multiplication AB is commutative, i.e., AB=BA. However, for matrices, multiplication is generally not commutative. Some special cases including two diagonal matrices, or multiplying with Identity matrix, are commutative.

Another special case in which matrix multiplication will also commute is when the two matrices are simultaneously diagonalizable. A and B are simultaneously diagonalizable if there is a matrix T such that both matrices can be factorized in the form $T D_a T^{-1}$ and $T D_b T^{-1}$, where $D_a$ and $D_b$ are diagonal matrices. This is also referred to as matrices A and B being diagonalizable in the same basis.

Toeplitz matrices commute asymptotically (when the row and column dimension tends to infinity). This means they diagonalize in the same basis. Linear convolution can be represented as multiplication of the input data vector by a Toeplitz matrix when dimensions of input vector and Toeplitz matrix tend to infinity.

A special case occurs if all filters have only one scalar coefficient, i.e., each filtering is just scalar multiplication by ($w_I$, $w'_I$, $w_Q$, $w'_Q$), so it is clear that the two stages A and B are commutative. The reason is that stage A (such as 603, 902) can be written as ($w_I$I), where $w_I$ is a scalar coefficient, and I is the identity matrix. Accordingly, stage A is commutative with any matrix, as illustrated by expression (4).

$$\begin{bmatrix} R_{I,1} \\ R_{Q,1} \end{bmatrix} = \begin{bmatrix} w'_Q & -1 \\ 1 & w'_Q \end{bmatrix} \begin{bmatrix} w_I & 0 \\ 0 & w_I \end{bmatrix} \begin{bmatrix} R_I \\ R_Q \end{bmatrix} \quad (4)$$

$$= \begin{bmatrix} w'_Q & -1 \\ 1 & w'_Q \end{bmatrix} w_I \begin{bmatrix} 1 & 0 \\ 0 & 1 \end{bmatrix} \begin{bmatrix} R_I \\ R_Q \end{bmatrix}$$

$$\begin{bmatrix} R_{I,1} \\ R_{Q,1} \end{bmatrix} = w_I \begin{bmatrix} 1 & 0 \\ 0 & 1 \end{bmatrix} \begin{bmatrix} w'_Q & -1 \\ 1 & w'_Q \end{bmatrix} \begin{bmatrix} R_I \\ R_Q \end{bmatrix} = \begin{bmatrix} R_{I,2} \\ R_{Q,2} \end{bmatrix}$$

For the case of multiple coefficients filters $w'_Q$ and $w_I$, stages A and B in expression (4) will be block matrices, where filters 610, 611, 612 and 613 are represented as Toeplitz matrices. Filter design 301 can represented as shown in expression (5).

$$\overline{R}_{out1} = \begin{bmatrix} \overline{R}_{I,1} \\ \overline{R}_{Q,1} \end{bmatrix} = \begin{bmatrix} W'_Q & -I \\ I & W'_Q \end{bmatrix} \begin{bmatrix} W_I & 0 \\ 0 & W_I \end{bmatrix} \begin{bmatrix} R_I \\ R_Q \end{bmatrix} \quad (5)$$

$$= \left( \begin{bmatrix} W'_Q & 0 \\ 0 & W'_Q \end{bmatrix} + \begin{bmatrix} 0 & -I \\ I & 0 \end{bmatrix} \right) \begin{bmatrix} W_I & 0 \\ 0 & W_I \end{bmatrix} \begin{bmatrix} I_{in} \\ Q_{in} \end{bmatrix}$$

$$= (I \otimes W'_Q + S \otimes I)(I \otimes W_I) \begin{bmatrix} R_I \\ R_Q \end{bmatrix}$$

$$= ((I \otimes W'_Q)(I \otimes W_I) + (S \otimes I)(I \otimes W_I)) \begin{bmatrix} R_I \\ R_Q \end{bmatrix}$$

$$= ((II \otimes W'_Q W_I) + (SI \otimes IW_I)) \begin{bmatrix} R_I \\ R_Q \end{bmatrix}$$

$$\overline{R}_{out1} = ((I \otimes W'_Q W_I) + (S \otimes W_I)) \begin{bmatrix} R_I \\ R_Q \end{bmatrix}$$

where $W'_Q$, $W_I$ are Toeplitz convolution matrices, and S is a switching matrix of the form $$\begin{bmatrix} 0 & -1 \\ 1 & 0 \end{bmatrix}.$$

The operator $\otimes$ represents the Kronecker multiplication.

In the last step in expression (5), the mixed-product property of Kronecker multiplication is used: if X, Y, Z and V are matrices such that the matrix products XZ and YV can be formed, then $(X \otimes Y)(Z \otimes V) = (XZ) \otimes (YV)$.

Similarly, a system model for filter design 901 can be represented as illustrated in expression (6).

$$\overline{R}_{out2} = \begin{bmatrix} \overline{R}_{I,2} \\ \overline{R}_{Q,2} \end{bmatrix} = \begin{bmatrix} W_I & 0 \\ 0 & W_I \end{bmatrix} \begin{bmatrix} W'_Q & -I \\ I & W'_Q \end{bmatrix} \begin{bmatrix} R_I \\ R_Q \end{bmatrix} \quad (6)$$

$$= (I \otimes W_I)(I \otimes W'_Q + S \otimes I) \begin{bmatrix} R_I \\ R_Q \end{bmatrix}$$

$$= ((I \otimes W_I)(I \otimes W'_Q) + (I \otimes W_I)(S \otimes I)) \begin{bmatrix} R_I \\ R_Q \end{bmatrix}$$

$$= ((II \otimes W_I W'_Q) + (IS \otimes W_I I)) \begin{bmatrix} R_I \\ R_Q \end{bmatrix}$$

$$\overline{R}_{out2} = ((I \otimes W_I W'_Q) + (S \otimes W_I)) \begin{bmatrix} R_I \\ R_Q \end{bmatrix}$$

$W'_Q$ and $W_I$ are asymptotically commutative, i.e., $W_I W'_Q = W'_Q W_I$, because they both are Toeplitz matrices.

Therefore, expressions (5) and (6) are equivalent, i.e., $\overline{R}_{out1} = \overline{R}_{out2}$, and accordingly, filter design 301 is equivalent to filter design 901.

Figure 12:
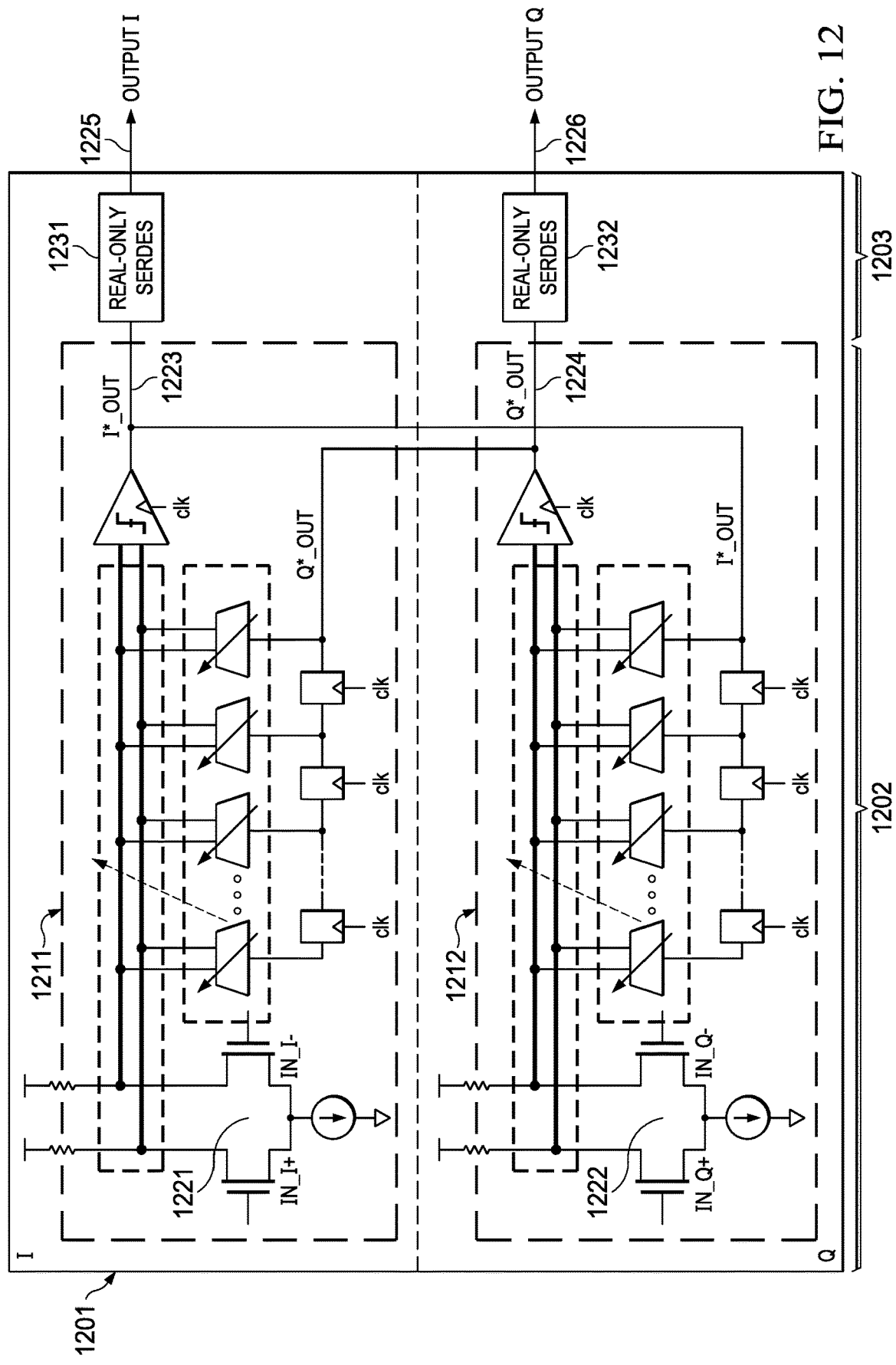
FIG. 12 is an example implementation of an equalizer for a complex channel using a standard SERDES circuit to form a decomposed two-stage filter.

FIG. 12 is an example implementation of a two-stage filter 1201 for a complex channel using a standard SERDES module 1231, 1232 to form a decomposed two-stage filter. Usually, a serializer-deserializer (SERDES) module performs serial-to-parallel conversions on data received from a peripheral device and parallel-to-serial conversion on data received from a CPU (central processing unit). A SERDES module may include control capability and a processor interrupt system that can be tailored to minimize software management of a communications link, for example. A design library may include a conventional SERDES module, which may be used in more complicated design projects. A standard SERDES module may include real-only equalization to provide signal equalization for a non-complex communication signal.

In this example, tapped delay-line quadrature-phase filters 1211, 1212 are interconnected to operate in a similar manner to tapped delay-line quadrature-phase filters 611, 612 in FIG. 6 in order to form a first stage 1202 that operates in a similar manner to first stage 602 in FIG. 6. Second stage 1203 is implemented using two standard real-only SERDES modules 1231, 1232 to perform real filtering of just a real component of the in-phase signal 1221 and quadrature phase signal 1222 which are received on the inputs of two-stage filter 1201. Second stage 1203 performs separate adaptive filtering of the compensated in-phase signal component 1223, using an in-phase filter within real-only SERDES module 1231 to produce filtered in-phase signal 625. Simultaneously, second stage filter 603 performs separate adaptive filter of the compensated quadrature-phase signal component 1224, using an in-phase filter within real-only SERDES module 1232 to produce filtered quadrature-phase signal 1226. Real-only SERDES modules 1231, 1232 provide a filtering function that is similar to in-phase filters 610, 613 of FIG. 6.

Adaptation

The filtering operation of the decomposed structure is equivalent to the single stage complex filtering as described above. However, the LMS adaptation for the decomposed structure is different and can be done in different ways. LMS adaptation is used to mimic a desired filter by finding the filter coefficients that relate to producing the least mean square of the error signal. For example, adaptation adjusts the respective filter coefficients for each tap, such as in multiplying unit 721 of FIG. 7.

Figure 13:
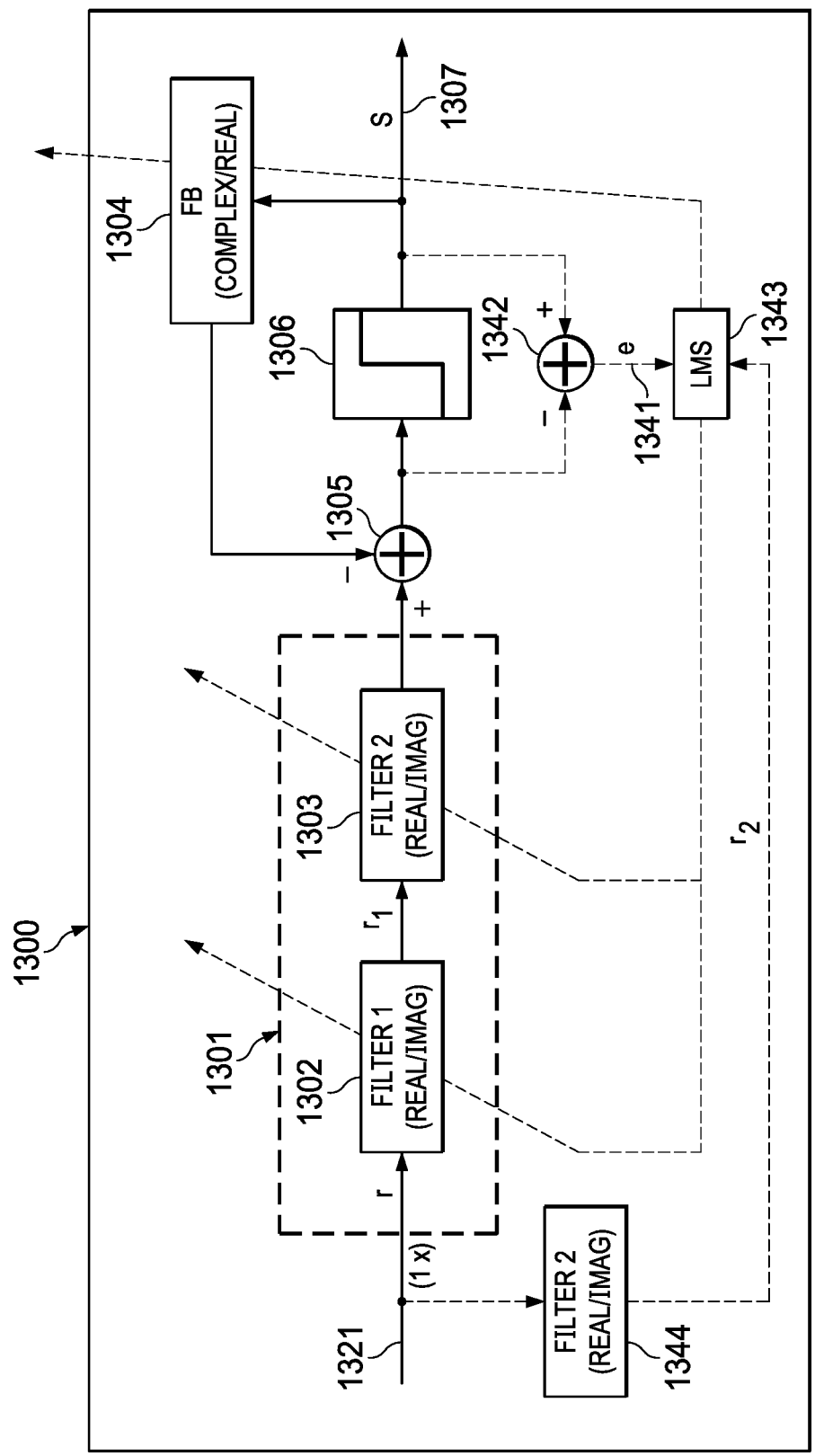
FIG. 13 is a block diagram of an example technique for joint adaptation of a decomposed filter structure.

FIG. 13 is a block diagram of an example technique for joint adaptation of a decomposed filter structure 1301 within equalizer 1300, for a complex channel that operates at a frequency of 100 GHz, or more. Joint adaptation minimizes the final error 1341 in the output signal 1307 of equalizer 1300. Equalizer 1300 includes a complex feedforward filter 1301, a complex feedback filter 1304, and a decision module 1306 that produces an output signal 1307 which is an equalized estimate of the input signal 1321 after subtracting the output of the feedback filter 1304 from the output of the feedforward filter using subtractor 1305. Two-stage feedforward filter 1301 is decomposed into two stages 1302, 1303 which may be similar to either of two-stage filters 301, 801, 901, 1001 described above in more detail.

Joint adaptation produces optimal performance similar to a single stage complex filter adaptation. However, it requires higher complexity because each filter 1302, 1303 must be adapted using the output of the other one.

In this example, error signal e 1341 is produced by subtractor 1342 according to expression (7). $w_1$, $w_2$ and $w_{fb}$ are vectors for filter stage 1, filter stage 2 and the feedback filter respectively. r1 and r2 vectors in the error signal computation is shown by expressions (8), (9) respectively.

$$e = s - (w_2 r1 - w_{fb} s) = s - (w_1 r2 - w_{fb} s) \quad (7)$$

$$r1(n) = w_1(n) * r(n) \quad (8)$$

$$r2(n) = w_2(n) * r(n) \quad (9)$$

$$w_1 = \quad (10)$$

$$\begin{cases} w_1 + \text{Real}\left[\dfrac{\mu \text{sgn}(r2^*)\text{sgn}(e)}{e\frac{\partial e}{\partial w1}}\right], & \text{where } w_1 \text{ is a pure real filter} \\ w_1 + \text{imag}\left[\dfrac{\mu \text{sgn}(r2^*)\text{sgn}(e)}{e\frac{\partial e}{\partial w1}}\right], & \text{where } w_1 \text{ is a pure \textit{imajinary} filter} \end{cases}$$

$$w_2 = \quad (11)$$

$$\begin{cases} w_2 + \text{Real}\left[\dfrac{\mu \text{sgn}(r1^*)\text{sgn}(e)}{e\frac{\partial e}{\partial w2}}\right], & \text{where } w_2 \text{ is a pure real filter} \\ w_2 + \text{imag}\left[\dfrac{\mu \text{sgn}(r1^*)\text{sgn}(e)}{e\frac{\partial e}{\partial w2}}\right], & \text{where } w_2 \text{ is a pure \textit{imajinary} filter} \end{cases}$$

Where sgn( ) in expressions (10) and (11) represents the sign operation, $$\text{sgn}(x) = \begin{cases} 1, & x \geq 0 \\ -1, & x < 0 \end{cases}$$

Using sgn(r1*), sgn(r2*) and sgn(e) in LMS adaptation expressions (10) and (11) is a suboptimal approach to achieve lower complexity design. However, for an optimal adaptation, sgn( ) operation may be removed and r1*, r2* and e are used directly.

$w_1$ in expression (10) represents first filter stage 1302 and is either a pure real filter or a pure imaginary filter. Same for $w_2$ in expression (11) which represents second filter stage 1303. Accordingly, in an example of real $w_1$ and imaginary $w_2$, r1 is the output of a pure real filter $w_1$ that is used to adapt a pure imaginary filter $w_2$. Same for r2.

For optimal joint adaptation, both r1 and r2 are required. However, in the main data path, only r1 is available. Therefore, for optimal adaptation, Filter 2 is implemented twice, in 1303 for main data path and in 1344 for the adaptation path. To avoid designing a same filter (Filter 2) twice, received signal r 1321 can be used to approximate both r1 and r2 in the adaptation algorithm shown by expressions (10), (11) respectively. By simulation, it is shown that this is a good approximation.

Figure 14:
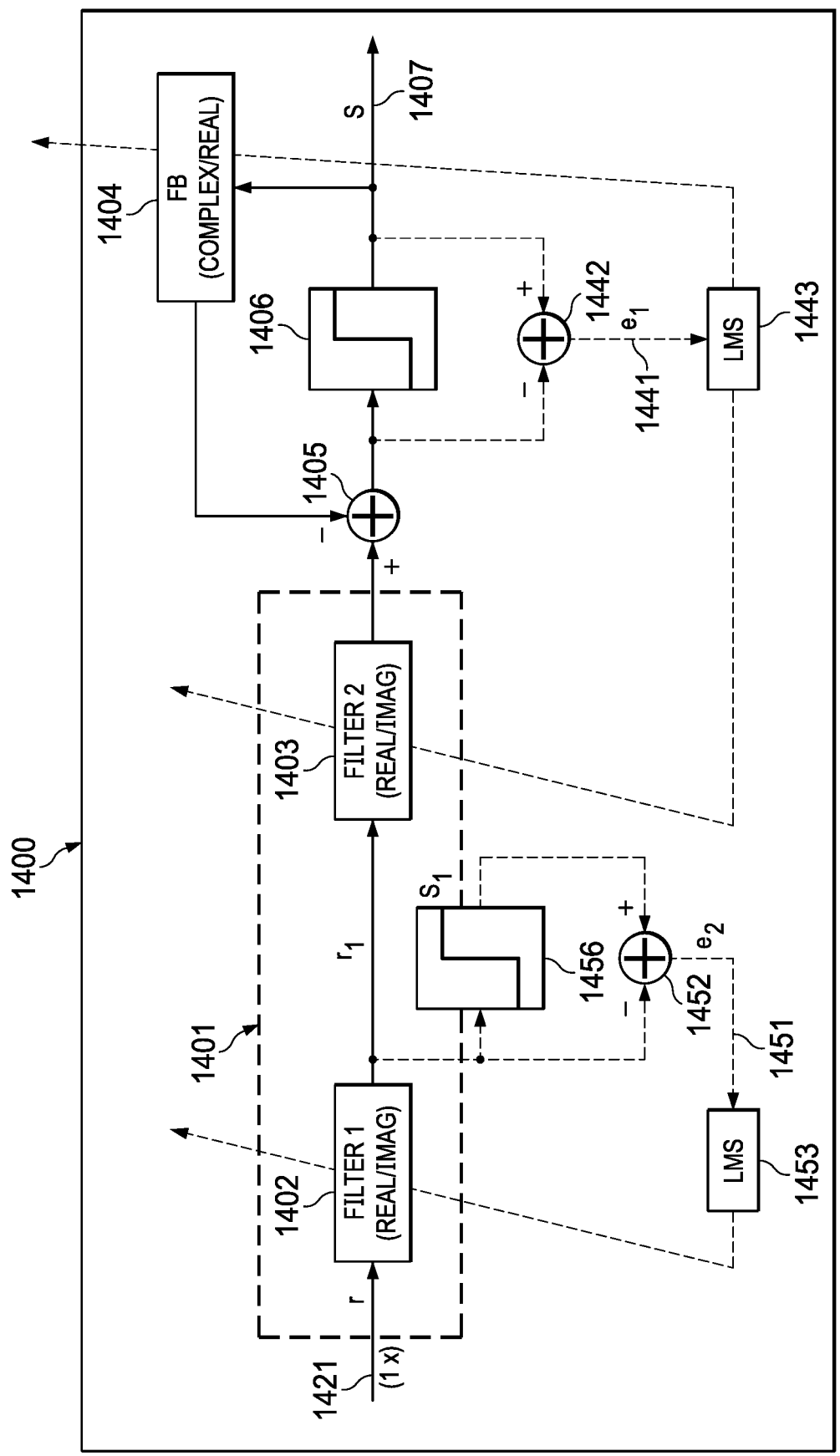
FIG. 14 is a block diagram of an example technique for independent adaptation of a decomposed filter structure.

FIG. 14 is a block diagram of an example technique for independent adaptation of a decomposed filter structure 1401 within equalizer 1400 for a complex channel that operates at a frequency of 100 GHz, or more. Equalizer 1400 includes a complex feedforward filter 1401, a complex feedback filter 1404, and a decision module 1406 that produces an output signal S 1407 which is an equalized estimate of the input signal 1421 after subtracting the output of the feedback filter 1404 from the output of the feedforward filter 1401 using subtractor 1405. Two-stage feedforward filter 1401 is decomposed into two stages 1402, 1403 which may be similar to either of two-stage filters 301, 801, 901, 1001 described above in more detail.

Independent adaptation is suboptimal, because the adaptation is done independently. However, independent adaptation is less complex, because each stage is completely independent. Because the adaptation is independent, standard SERDES modules can be used for the second stage filter 1403, similar to SERDES 1231, 1232 of FIG. 12.

In this example, error signal e1 1441 is produced by subtractor 1442 according to expression (12). Decision module 1456 produces an output signal S1 that is an estimate of the intermediate signal r1 Error signal e2 1451 is produced by subtractor 1452 according to expression (13).

$W_1$ in expression (15) represents first filter stage 1402 and is either a pure real filter or a pure imaginary filter. Same for $W_2$ in expression (16) that represents second filter stage 1403. Accordingly, in the case of real $w_1$ and imaginary $w_2$, r1 is the output of a pure real filter $w_1$ that is used to independently adapt a pure imaginary filter $w_2$.

$$e1 = s - (w_2 r1 - w_{fb} s) \quad (12)$$

$$e2 = s1 - (w_1 r) \quad (13)$$

$$r1(n) = w_1(n) * r(n) \quad (14)$$

$$w_1 = \quad (15)$$

$$\begin{cases} w_1 + \text{Real}\left[\dfrac{\mu \text{sgn}(r^*)\text{sgn}(e2)}{e\frac{\partial e2}{\partial w1}}\right], & \text{where } w_1 \text{ is a pure real filter} \\ w_1 + \text{imag}\left[\dfrac{\mu \text{sgn}(r^*)\text{sgn}(e2)}{e\frac{\partial e2}{\partial w1}}\right], & \text{where } w_1 \text{ is a pure \textit{imajinary} filter} \end{cases}$$

$$w_2 = \quad (16)$$

$$\begin{cases} w_2 + \text{Real}\left[\dfrac{\mu \text{sgn}(r1^*)\text{sgn}(e1)}{e1\frac{\partial e1}{\partial w2}}\right], & \text{where } w_2 \text{ is a pure real filter} \\ w_2 + \text{imag}\left[\dfrac{\mu \text{sgn}(r1^*)\text{sgn}(e1)}{e1\frac{\partial e1}{\partial w2}}\right], & \text{where } w_2 \text{ is a pure \textit{imajinary} filter} \end{cases}$$

LMS adaptation module 1453 receives error signal e2 and generates an output signal that is coupled to control adaptation of the filter coefficients of first filter stage 1402 using known or later developed LMS adaptation techniques. LMS adaptation module 1443 receives error signal e1 and generates an output signal which is coupled to independently control adaptation of the filter coefficients of second filter stage 1403 using known or later developed LMS adaptation techniques.

Optimizing the Tap of Decision

The tap of decision can be optimized during the run-time without extra hardware. For the decision directed mode, changing the filter initialization is enough to change the decision tap. For example, referring again to FIG. 7, tapped delay line 720 can be initialized to all zeros, except the decision tap is set to one at runtime. This allows a system designer to try all possible initializations and choose the optimum decision tap based on the average equalizer error signal.

Table 1 summarizes simulated signal to interference ratio (SIR) of various equalizer configurations, including symmetric, Rosenberger, asymmetric 7/5, and asymmetric 7/5 with a +5% frequency shift. The first column of results is for a conventional single stage equalizer, such as illustrated in FIG. 5. The second column is for a decomposed feedforward filter with joint adaptation, such as illustrated in FIG. 13. The third column is for a decomposed feedforward filter with independent adaptation, in which the first stage performs filters the imaginary component of the complex signal while the second stage filters the real component, such as illustrated in FIG. 14.

TABLE 1

LMS decomposed filter equalizer with 5-tap complex feedforward filter and 1-tap complex feedback filter

| | signal to interference ratio (SIR) [dB] | | |
|---|---|---|---|
| Channel | Single stage equalizer | Decomposed (joint adapt.) | Decomposed (Independent adapt. Imag-Real) |
| Symmetric | 55.7 | 55.2 | 43.4 |
| Rosenberger | 35.5 | 36.2 | 32.5 |
| Asymmetric 7/5 | 48.7 | 48.5 | 41 |
| Asymmetric 7/5 (+5% frequency shift) | 28.5 | 32.5 | 25.2 |

As illustrated in Table 1, a decomposed structure with joint adaptation achieves almost the same performance as the single stage complex structure. For the decomposed structure with independent adaptation, decomposed structure with independent adaptation, Imaginary-Real performance shows some degradation because it is a suboptimal approach as discussed earlier.

Figure 15:
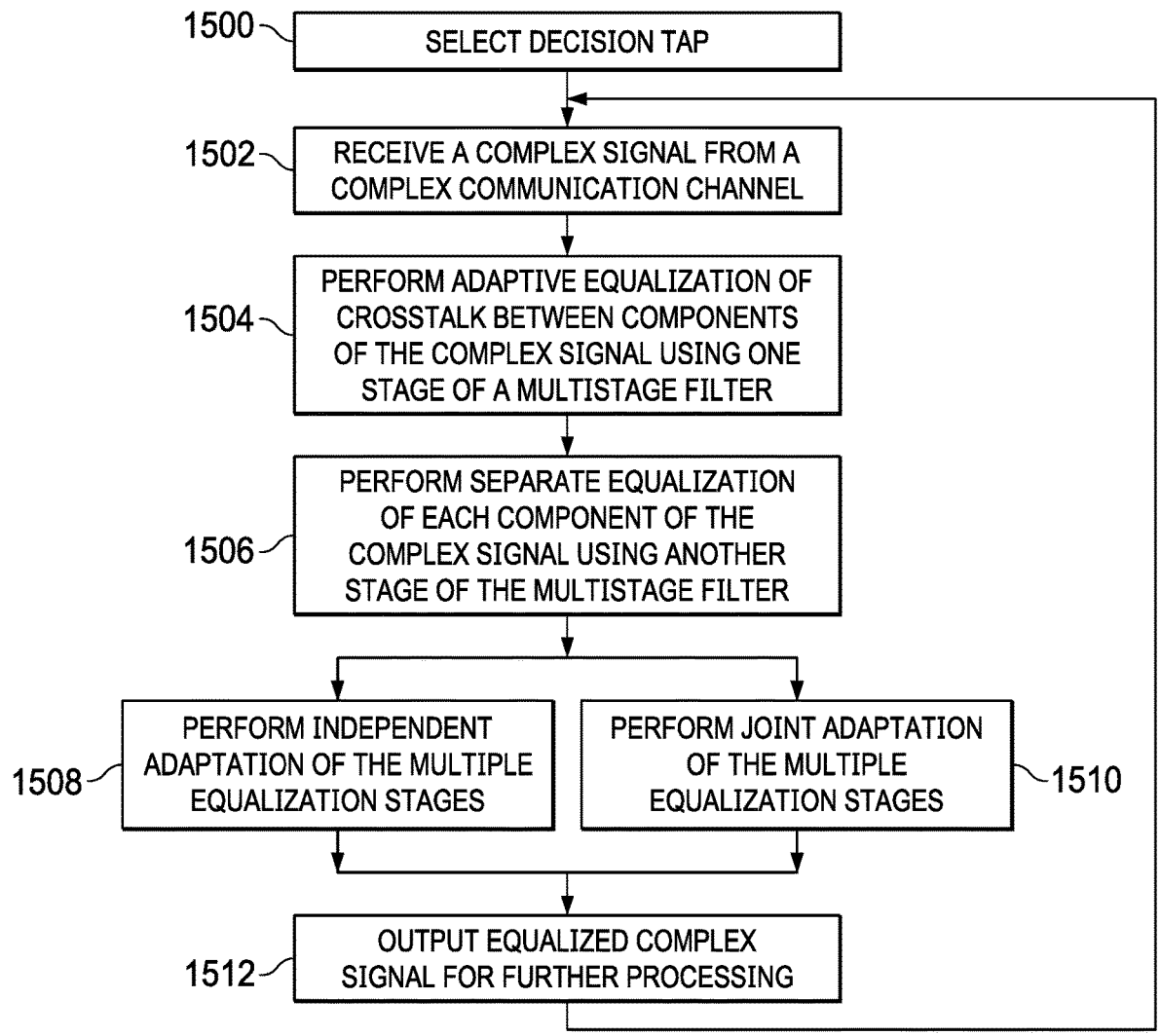
FIG. 15 is a flow chart of operation of a decomposed two-stage filter for a complex channel.

FIG. 15 is a flow chart illustrating operation of a decomposed two-stage filter for a complex channel. The two-stage feedforward is decomposed into two stages which may be similar to either of two-stage filters 301, 801, 901, 1001 described above in more detail.

At 1502, a complex signal is received from a complex communication channel. In various examples, the complex signal includes an in-phase component and a quadrature phase component, such as generated by a QAM transmitter. In other examples, the complex signal may be generated by a QPSK transmitter. In other examples, other known or later developed techniques may be used to produce a complex communication signal. In this example, the complex communication signal is propagated through a DWG having a multipath channel effect. Therefore, if information is modulated in magnitude and phase of a transmitted passband sinusoidal signal, the DWG will affect magnitude and phase. Equivalently, in a base-band equivalent model, in-phase and quadrature-phase components of an information signal will be impacted.

At 1504, one of the filter stages is configured to perform adaptive equalization of crosstalk between a first signal component and a second signal component of the complex signal, as described in more detail above, such as described for stage 602 in FIG. 6, 802 in FIG. 8, 903 in FIG. 9, or 1003 in FIG. 10.

At 1506, another one of the filter stages is configured to perform separate adaptive equalization of the first signal component and separate adaptive equalization of the second signal component, as described in more detail above, such as described for stage 603 in FIG. 6, 803 in FIG. 8, 902 in FIG. 9, or 1002 in FIG. 10.

In some examples, the crosstalk equalization is performed first, and then the separate signal component equalization is performed second. In other examples, the crosstalk equalization is performed second, while the separate signal component equalization is performed first.

In some examples, independent adaptation of the two equalization stages is performed at 1508. An example of independent adaptation is described in more detail above, such as described for decomposed filter 1401 in FIG. 14.

In some examples, joint adaptation of the two equalization stages is performed at 1510. An example of joint adaptation is described in more detail above, such as for decomposed filter 1301 in FIG. 13.

At 1512, an equalized complex signal sample is output for further processing in an associated signal processing system that is coupled to receive the output signal. As each sample or portion of the output signal is output, the process repeats in a continuous manner at 1502.

In this manner, for a DWG complex channel (or any complex channel), several advantages are provided by a low complexity more flexible decomposed two-stage cascaded real-imaginary or imaginary-real filter structure. The decomposed filter structure has flexibility in the design choice of joint or independent LMS adaptation for the two stages. At 1500, the number of taps of each stage can be selected by a system designer to be the same or different. The position of each stage (i.e., which one is first and which is second) can be varied.

The feedback filter can be designed as a single stage complex feedback or decomposed feedback filtering, depending on system accuracy and cost considerations.

Examples can be implemented as a standalone solution using joint adaptation, which performs better than the single stage and has lower complexity, or integrated with current SERDES solutions by setting the first stage as a pure imaginary filter that is independently adapted.

OTHER EMBODIMENTS

In described examples, the received complex signal is a QPSK type complex signal. In other examples, various types of complex signals that have quadrature or other amounts of phase shift may be accommodated by appropriate selection of taps and tap coefficients.

In described examples, the feedback filter is a single stage complex filter. In another example, the feedback filter may be designed as a decomposed two-stage filter.

In described examples, a decision feedback complex equalizer is illustrated. In another example, a linear complex equalizer (which only has a feedforward filter) may be implemented.

In described examples, a complex signal with in-phase and quadrature-phase components is described, so there is a 90-degree phase relationship. In another example, a different phase relationship may exist, such as a 120-degree relationship, a 45-degree relationship, etc.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. A signal equalizer comprising:
 a feedforward filter including:
   an output;
   a first filter stage including:

a first filter configured to receive an in-phase signal component and output a filtered in-phase signal; and a second filter configured to receive a quadrature-phase signal component and output a filtered quadrature-phase signal; and a second filter stage including:
a third filter coupled to the second filter to receive the filtered quadrature-phase signal;
a fourth filter coupled to the first filter to receive the filtered in-phase signal;
a first adder circuit coupled to the first and third filters and configured to combine the filtered in-phase signal with an output of the third filter, and provide an equalized in-phase signal; and
a second adder circuit coupled to the second and fourth filters and configured to combine the filtered quadrature-phase signal with an output of the fourth filter, and provide an equalized quadrature-phase signal;

a decision device having an input and an output wherein the output of the decision device is coupled to a feedback filter;

the feedback filter having an input and an output, the input of the feedback filter coupled to the output of the decision device; and a subtractor having an output and first and second inputs, the first input of the subtractor coupled to the output of the feedforward filter, the second input of the subtractor coupled to the output of the feedback filter, and the output of the subtractor coupled to the input of the decision device.

2. The signal equalizer of claim 1, further comprising:
first adaptation circuitry coupled to the first filter stage, the first adaptation circuitry configured to adapt coefficients of the first filter stage; and
second adaptation circuitry coupled to the second filter stage, the second adaptation circuitry configured to adapt coefficients of the second filter stage.

3. The signal equalizer of claim 1, further comprising adaptation circuitry coupled to the first and second filter stages, the adaptation circuitry configured to adapt coefficients of the first and second filter stages.

4. The signal equalizer of claim 1, wherein the feedback filter is a two-stage complex filter including a first stage and a second stage coupled in series with the first stage.

5. The signal equalizer of claim 1, wherein the feedback filter is a single stage complex filter.

6. The signal equalizer of claim 1, wherein the first filter stage has a number n of taps, the second filter stage has a number m of taps, the feedback filter has a number t of taps, and t is less than n.

7. The signal equalizer of claim 1, further comprising:
first adaptation circuitry coupled the first filter stage, the first adaptation circuitry configured to adapt coefficients of the first filter stage; and second adaption circuitry coupled to the second filter stage, the second adaptation circuitry configured to adapt filter coefficients of the second filter stage, in which one of the first adaptation circuitry or the second adaptation circuitry is coupled to the feedback filter and configured to adapt coefficients of the feedback filter.

8. The signal equalizer of claim 1, further comprising:
adaptation circuitry coupled the first and second filter stages and to the feedback filter, the adaptation circuitry configured to adapt coefficients of the first and second filter stages and the feedback filter.

9. A signal equalizer comprising:
a feedforward filter including:
an output;
a first filter stage including:
a first filter having an input to receive an in-phase signal component, and having an output; and
a second filter having an input to receive a quadrature-phase signal component, and having an output; and
a second filter stage including:
a third filter having an input coupled to the output of the second filter, the third filter having an output;
a fourth filter having an input coupled to the output of the first filter, the fourth filter having an output;
a first adder circuit having a first input coupled to the output of the first filter and having a second input coupled to the output of the third filter; and
a second adder circuit having a first input coupled to the output of the second filter and having a respective second input coupled to the output of the fourth filter;

a decision device having an input and an output wherein the output of the decision device is coupled to a feedback filter;

the feedback filter having an input and an output, the input of the feedback filter coupled to the output of the decision device; and a subtractor having an output and first and second inputs, the first input of the subtractor coupled to the output of the feedforward filter, the second input of the subtractor coupled to the output of the feedback filter, and the output of the subtractor coupled to the input of the decision device.

10. The signal equalizer of claim 9, further comprising:
first adaptation circuitry coupled to the first filter stage, the first adaptation circuitry configured to adapt coefficients of the first filter stage; and
second adaptation circuitry coupled to the second filter stage, the second adaptation circuitry configured to adapt coefficients of the second filter stage.

11. The signal equalizer of claim 9, further comprising adaptation circuitry coupled to the first and second filter stages, the adaptation circuitry configured to adapt coefficients of the first and second filter stages.

* * * * *